US012772209B2

(12) United States Patent
Hong et al.

(10) Patent No.: US 12,772,209 B2
(45) Date of Patent: Oct. 20, 2026

(54) METHOD AND DEVICE FOR ALLOCATING RESOURCES ON BASIS OF INTER-UE ADJUSTMENT INFORMATION IN SIDELINK COMMUNICATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Iksan-si (KR)

(73) Assignees: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 335 days.

(21) Appl. No.: 18/243,244

(22) Filed: Sep. 7, 2023

(65) Prior Publication Data

US 2023/0422216 A1 Dec. 28, 2023

Related U.S. Application Data

(63) Continuation of application No. PCT/KR2022/006175, filed on Apr. 29, 2022.

(30) Foreign Application Priority Data

May 7, 2021 (KR) ........................ 10-2021-0059560

(51) Int. Cl.
*H04W 72/04* (2023.01)
*H04W 4/00* (2018.01)
(Continued)

(52) U.S. Cl.
CPC ........... *H04W 72/02* (2013.01); *H04W 72/40* (2023.01)

(58) Field of Classification Search
None
See application file for complete search history.

(56) References Cited

U.S. PATENT DOCUMENTS 12,200,757 B2 * 1/2025 Lee ......................... H04W 4/40
2021/0195560 A1 * 6/2021 Ryu ..................... H04B 7/0695
(Continued)

FOREIGN PATENT DOCUMENTS

WO 2017/014555 A1 1/2017

OTHER PUBLICATIONS

ZTE, Sanechips, 'Discussion on the inter-UE coordination', RI-2102921, 3GPP TSG RAN WGI #104b-e, e-Meeting, Apr. 7, 2021.
(Continued)

*Primary Examiner* — Sai Aung
(74) *Attorney, Agent, or Firm* — MCDONNELL BOEHNEN HULBERT & BERGHOFF LLP

(57) ABSTRACT

A method and device for allocating resources based on inter-UE adjustment information in sidelink communication comprises receiving, from a second user-equipment, signaling #1 triggering transmission of inter-UE adjustment information, determining the type of resource to be notified to the second user-equipment, based on an information element included in the signaling #1, selecting a resource having the determined type, generating the inter-UE adjustment information comprising information indicating the selected resource, and transmitting, to the second user-equipment, signaling #2 comprising the inter-UE adjustment information.

9 Claims, 8 Drawing Sheets

(51) Int. Cl.
*H04W 72/02* (2009.01)
*H04W 72/40* (2023.01)

(56) References Cited

U.S. PATENT DOCUMENTS

| | | | | |
|---|---|---|---|---|
| 2021/0250772 | A1* | 8/2021 | Farag | H04W 16/02 |
| 2022/0159725 | A1* | 5/2022 | Liu | H04W 74/0808 |
| 2022/0322359 | A1* | 10/2022 | Ye | H04W 72/02 |
| 2022/0322360 | A1* | 10/2022 | Ye | H04W 72/563 |
| 2022/0361185 | A1* | 11/2022 | Sarkis | H04L 5/0055 |
| 2023/0012983 | A1* | 1/2023 | Zhang | H04W 72/25 |
| 2023/0180270 | A1* | 6/2023 | Liu | H04W 72/40<br>370/329 |
| 2023/0276472 | A1* | 8/2023 | Hu | H04W 72/02<br>370/230 |
| 2023/0371090 | A1* | 11/2023 | Miao | H04W 76/14 |

OTHER PUBLICATIONS

Nokia, Nokia Shanghai Bell, 'Inter-UE coordination in sidelink resource allocation mode 2', RI-2102362, 3GPP TSG RAN WG1#104b-e, e-Meeting, Apr. 7, 2021.
Spreadtrum Communications, 'Discussion on inter-UE coordination in sidelink resource allocation', RI-2102468, 3GPP TSG RAN WGI #104b-e, e-Meeting, Apr. 7, 2021.
Ericsson, 'Feasibility and benefits of mode 2 enhancements for inter-UE coordination', RI-2006445, 3GPP TSG-RAN WGI Meeting #102-e, e-Meeting, Aug. 7, 2020.

* cited by examiner

METHOD AND DEVICE FOR ALLOCATING RESOURCES ON BASIS OF INTER-UE ADJUSTMENT INFORMATION IN SIDELINK COMMUNICATION

CROSS REFERENCE TO RELATED APPLICATIONS

This application is a continuation of International Application PCT/KR2022/006175, filed Apr. 29, 2022, which claims priority to Korean Patent Application No. 10-2021-0059560, filed on May 7, 2021, in the Korean Intellectual Property Office, the disclosure of each of which is incorporated by reference herein in its entirety.

TECHNICAL FIELD

The present disclosure relates to a sidelink resource allocation technique, and more particularly, to a resource allocation technique based on inter-user equipment (UE) coordination information.

BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, a sidelink resource allocation scheme may be classified into mode 1 and mode 2. When using the mode 1, a base station may allocate sidelink resources to a terminal. When using the mode 2, a transmitting terminal may determine sidelink resources by performing a resource sensing operation and/or a resource selection operation. Power consumption may increase due to the resource sensing operation and/or resource selection operation performed by the transmitting terminal. When the transmitting terminal has a limited power capacity and/or when the transmitting terminal has a limited resource sensing capability, the transmitting terminal may not normally perform the resource sensing operation and/or resource selection operation. In addition, resource allocation efficiency may decrease when the mode 2 is used due to a hidden node problem, exposed node problem, half-duplex problem, and/or the like. In order to solve the above-described problem, methods for performing a resource sensing operation and/or resource selection operation based on assistance of a neighboring terminal are required.

SUMMARY

The present disclosure is directed to providing a method and an apparatus for allocating sidelink resources based on inter-UE coordination information.

A method of a first user-equipment, according to a first exemplary embodiment of the present disclosure for achieving the above-described objective, may comprise receiving, from a second user-equipment, a signaling #1 triggering transmission of inter-user equipment (UE) coordination information, determining a type of resource(s) to be informed to the second user-equipment based on information element(s) included in the signaling #1, selecting resource(s) having the determined type, generating inter-UE coordination information including information indicating the selected resource(s), and transmitting, to the second user-equipment, a signaling #2 including the inter-UE coordination information.

When the signaling #1 includes resource information, the determined type may be non-preferred resource(s), and the inter-UE coordination information may indicate the non-preferred resource(s) within a resource region indicated by the resource information.

When the signaling #1 includes resource information, the determined type is non-preferred resource(s), and all resources belonging to a resource region indicated by the resource information are non-preferred resource(s), the inter-UE coordination information may indicate preferred resource(s).

When the signaling #1 does not include resource information, the determined type may be preferred resource(s), and the inter-UE coordination information may indicates the preferred resource(s).

The inter-UE coordination information may further include information indicating a type of the selected resource(s) indicated by the inter-UE coordination information.

The signaling #1 may include information on a resource size required by the second user-equipment, and a size of the selected resource(s) indicated by the inter-UE coordination information may correspond to the resource size indicated by the signaling #1.

The method may further comprise when the signaling #1 includes resource information, and a size of resources excluding non-preferred resources within a resource region indicated by the resource information is smaller than the resource size, additionally selecting preferred resource(s) outside the resource region.

A method of a second user-equipment, according to a second exemplary embodiment of the present disclosure for achieving the above-described objective, may comprise transmitting, to a first user-equipment, a signaling #1-1 for triggering transmission of inter-user equipment (UE) coordination information, receiving, from the first user-equipment, a signaling #2-1 including inter-UE coordination information, identifying a type of resource(s) indicated by the inter-UE coordination information based on information element(s) included in the signaling #1-1, and determining sidelink resource(s) in consideration of the resource(s) having the identified type, wherein the identified type is preferred resource(s) or non-preferred resource(s).

When the signaling #1-1 includes resource information, the type of the resource(s) indicated by the inter-UE coordination information may be identified as non-preferred resource(s).

When the signaling #1-1 does not include resource information, the type of the resource(s) indicated by the inter-UE coordination information may be identified as preferred resource(s).

The inter-UE coordination information may include information indicating the type.

The signaling #1-1 may include information on a resource size required by the second user-equipment, and a size of the resource(s) indicated by the inter-UE coordination information may correspond to the resource size indicated by the signaling #1-1.

The method may further comprise transmitting, to a third user-equipment, a signaling #1-2 triggering transmission of inter-UE coordination information, and receiving, from the third user-equipment, a signaling #2-2 including inter-UE coordination information, wherein the signaling #1-1 and the signaling #1-2 may be transmitted in a unicast scheme, and the sidelink resource(s) may be determined based on the inter-UE coordination information included in the signaling #2-1 and the signaling #2-2.

The method may further comprise when the signaling #1-1 is transmitted to the second user-equipment and the third user-equipment in a groupcast scheme, receiving, from the third user-equipment, a signaling #2-2 including inter-UE coordination information from the third user-equipment, wherein the sidelink resource(s) may be determined based on the inter-UE coordination information included in the signaling #2-1 and the signaling #2-2.

A first user-equipment, according to a third exemplary embodiment of the present disclosure for achieving the above-described objective, may comprise a processor, and a memory storing one or more instructions executable by the processor, wherein the one or more instructions are executed to perform receiving, from a second user-equipment, a signaling #1 triggering transmission of inter-user equipment (UE) coordination information, determining a type of resource(s) to be informed to the second user-equipment based on information element(s) included in the signaling #1, selecting resource(s) having the determined type, generating inter-UE coordination information including information indicating the selected resource(s), and transmitting, to the second user-equipment, a signaling #2 including the inter-UE coordination information.

When the signaling #1 includes resource information, the determined type may be non-preferred resource(s), and the inter-UE coordination information may indicate the non-preferred resource(s) within a resource region indicated by the resource information.

When the signaling #1 does not include resource information, the determined type may be preferred resource(s), and the inter-UE coordination information may indicate the preferred resource(s).

The inter-UE coordination information may further include information indicating a type of the selected resource(s) indicated by the inter-UE coordination information.

The signaling #1 may include information on a resource size required by the second user-equipment, and a size of the selected resource(s) indicated by the inter-UE coordination information may correspond to the resource size indicated by the signaling #1.

The one or more instructions may be further executed to perform when the signaling #1 includes resource information, and a size of resources excluding non-preferred resources within a resource region indicated by the resource information is smaller than the resource size, additionally selecting preferred resource(s) outside the resource region.

According to the present disclosure, a user equipment (UE)-B may transmit a signaling #1 triggering transmission of inter-UE coordination information to a UE-A. When the signaling #1 includes resource information, the UE-A may transmit a signaling #2 including inter-UE coordination information indicating non-preferred resource(s) to the UE-B. When the signaling #1 does not include resource information, the UE-A may transmit a signaling #2 including inter-UE coordination information indicating preferred resource(s) to the UE-B. The UE-B may receive the inter-UE coordination information from the UE-A. The UE-B may determine the type of resource(s) indicated by the inter-UE coordination information (e.g., preferred resource(s) or non-preferred resource(s)) according to whether resource information is included in the signaling #1, and may determine resource(s) for sidelink communication in consideration of resource(s) having the identified type. Therefore, sidelink communication can be performed efficiently.

DETAILED DESCRIPTION

Figure 1:
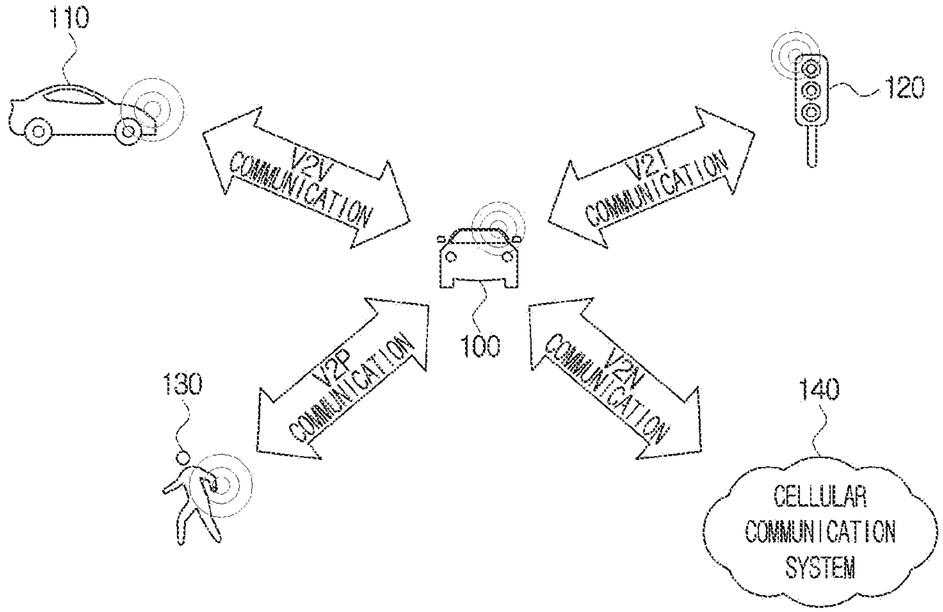
FIG. 1 is a conceptual diagram illustrating V2X communication scenarios.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, (re)transmission may mean 'transmission', 'retransmission', or 'transmission and retransmission', (re)configuration may mean 'configuration', 'reconfiguration', or 'configuration and reconfiguration', (re)connection may mean 'connection', 'reconnection', or 'connection and reconnection', and (re)access may mean 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
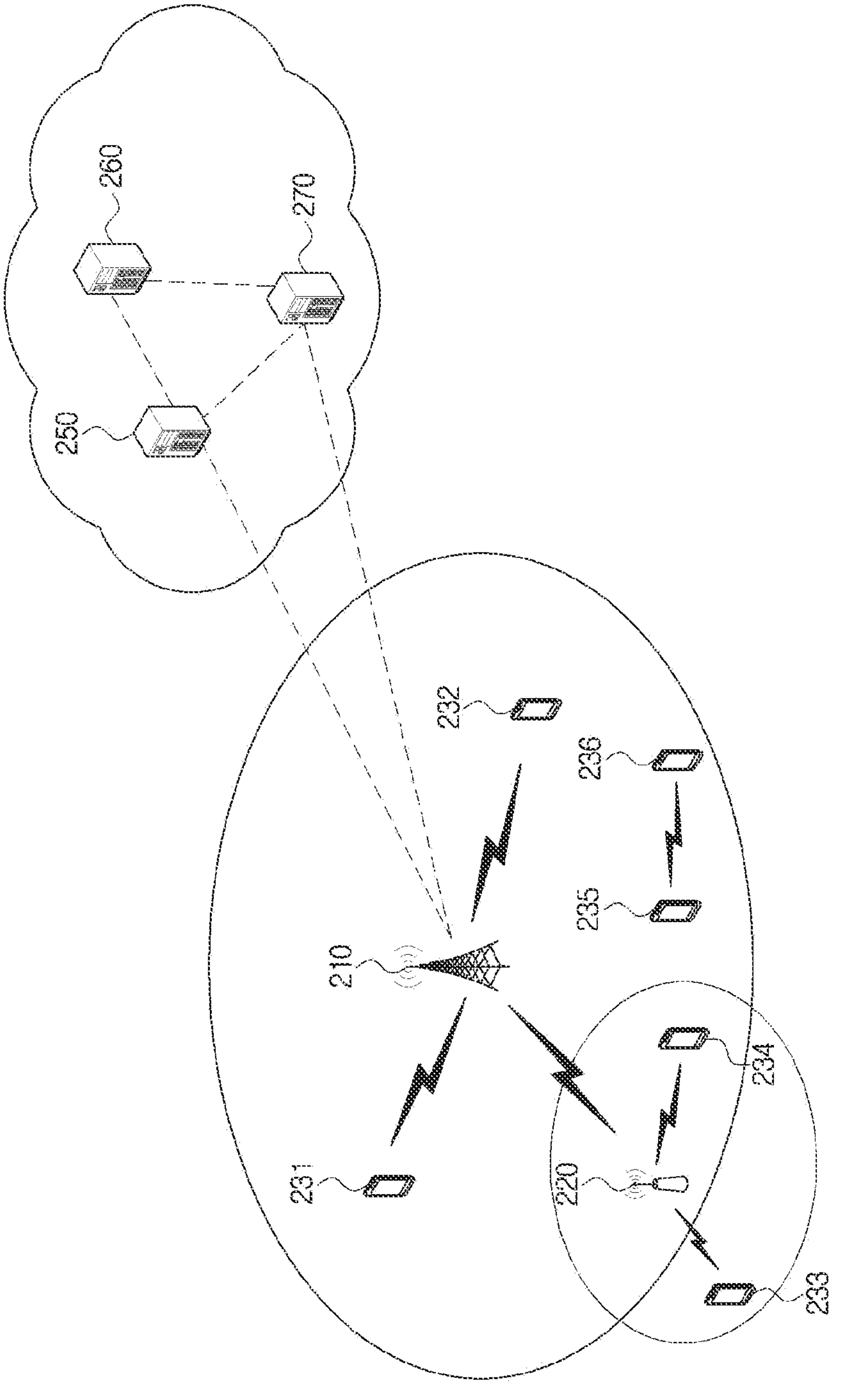
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
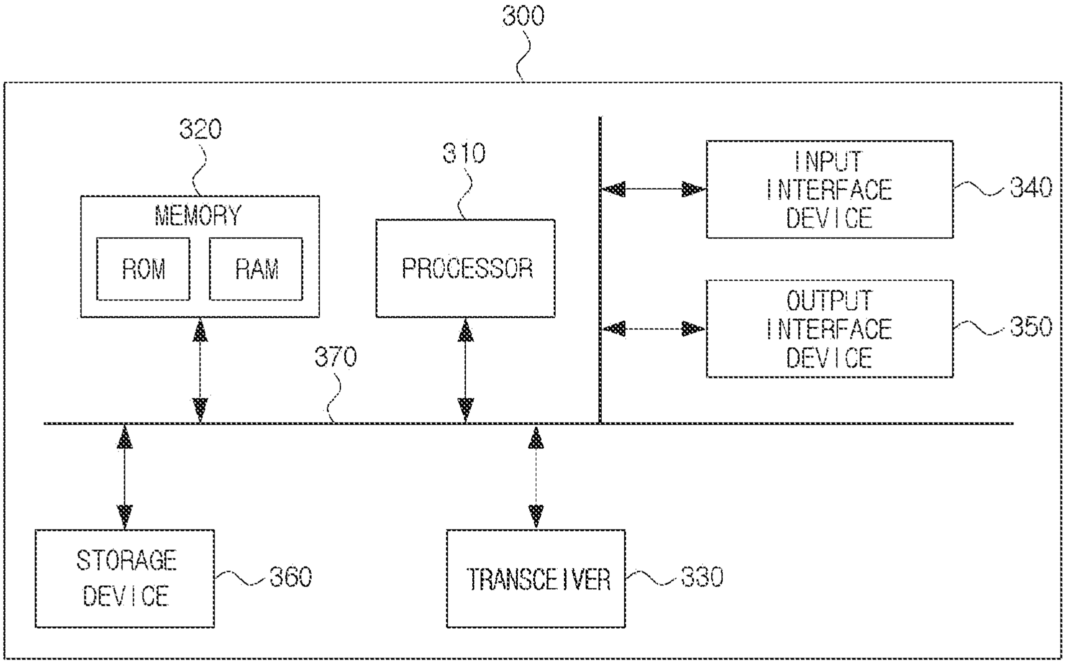
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
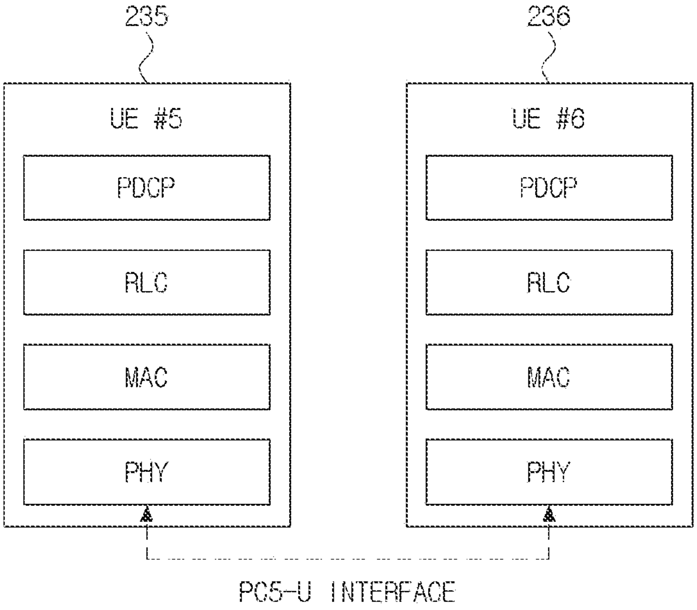
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARM) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
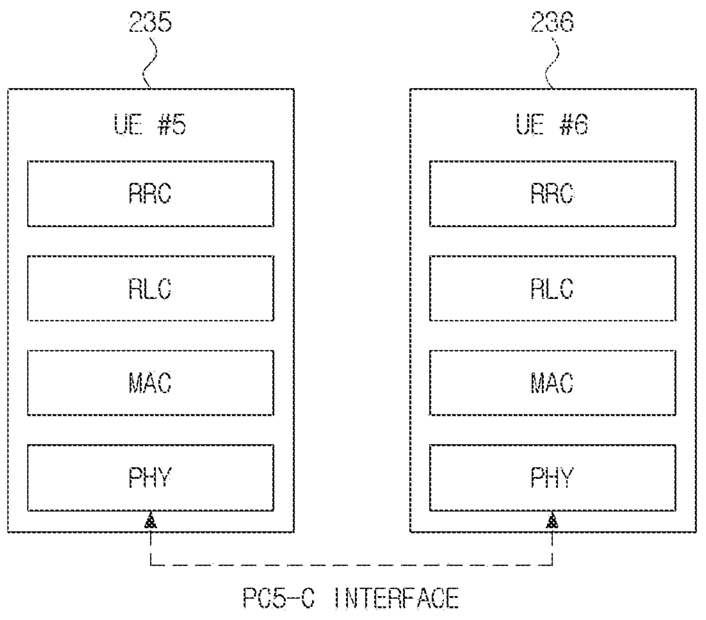
FIG. 5 is a block diagram illustrating a first exemplary embodiment of a control plane protocol stack of a UE performing sidelink communication.
Figure 6:
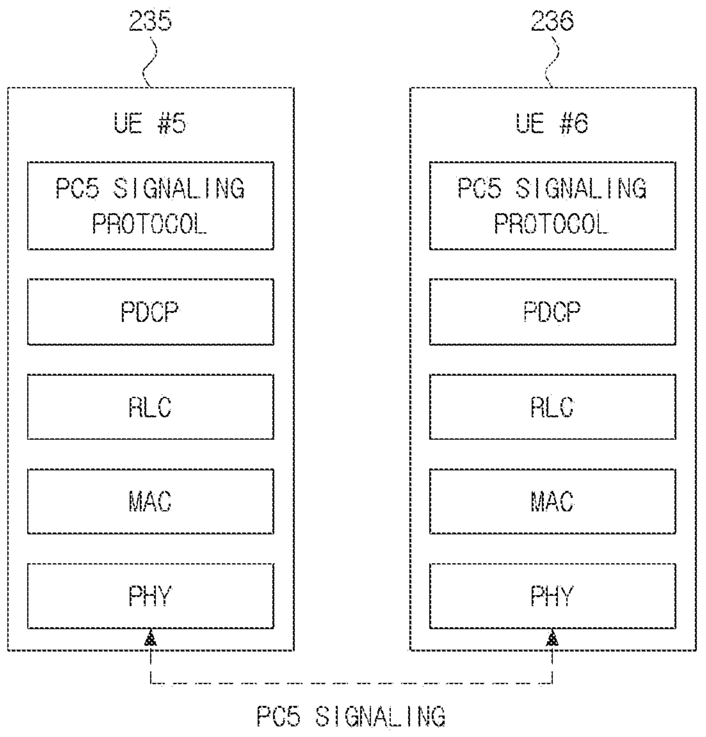
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A, a SCI format 2-B, and a SCI format 2-C.

The first-stage SCI may include or more information elements among priority information, frequency resource assignment information, time resource assignment information, resource reservation period information, demodulation reference signal (DMRS) pattern information, second-stage SCI format information, a beta offset indicator, the number of DMRS ports, and modulation and coding scheme (MCS) information. The second-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or provision of inter-UE coordination information.

A UE transmitting inter-UE coordination information may be referred to as 'UE-A (or 'first terminal'), and a UE receiving the inter-UE coordination information may be referred to as a 'UE-B (or 'second terminal)'. The inter-UE coordination information may be transmitted from the UE-A at a request of the UE-B. Alternatively, the inter-UE coordination information may be transmitted from the UE-A without a request from the UE-B. The inter-UE coordination information may indicate resource(s) (e.g., resource set). The type of resource(s) indicated by the inter-UE coordination information may be classified into a type A, type B, and type C. Resource(s) having the type A may be preferred or recommended resource(s). The preferred resource(s) may be determined based on a resource sensing result. Resource(s) having the type B may be non-preferred or not-recommended resource(s). The non-preferred resource(s) may be determined based on a resource sensing result, expected resource conflict, and/or potential resource conflict. Resource(s) having the type C may be conflicting resource(s). The conflicting resource(s) may be resource(s) in which a conflict occurs, resource(s) in which a conflict is expected to occur, or resource(s) with a potential conflict. In addition, the inter-UE coordination information may indicate the existence of preferred resource(s), non-preferred resource(s), or conflicting resource(s).

In exemplary embodiments, configuration of an operation (e.g., transmission operation) may mean that configuration information (e.g., information element(s), parameter(s)) for the operation and/or information indicating to perform the operation is signaled. Configuration of information element(s) (e.g., parameter(s)) may mean that the information element(s) are signaled. The signaling may be at least one of system information (SI) signaling (e.g., transmission of a system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)). Here, the MAC CE signaling operation may be performed through a data channel, the PHY signaling operation may be performed through a control channel or a data channel, and transmission of SCI may mean transmission of first-stage SCI and/or second-stage SCI.

Figure 7:
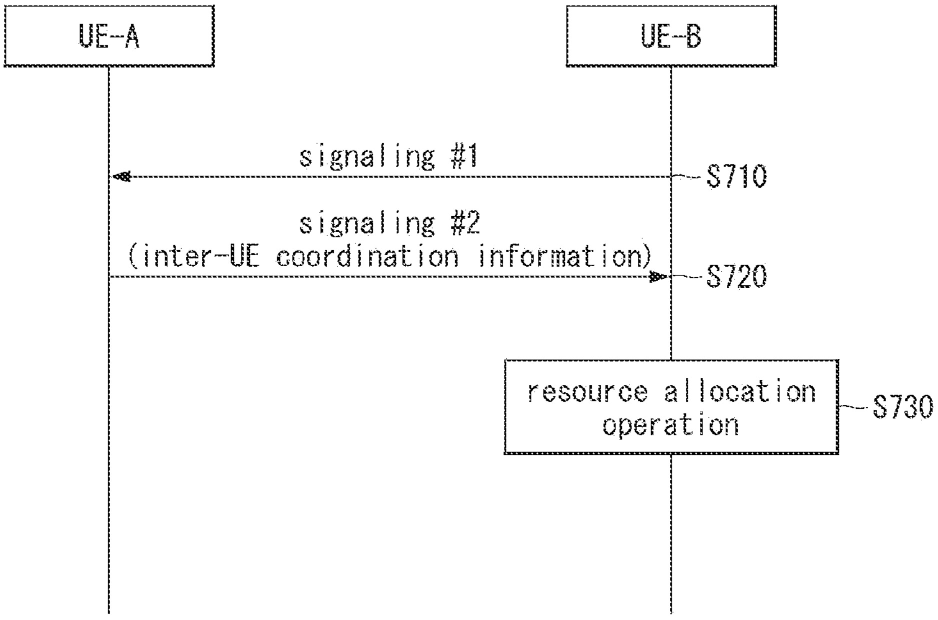
FIG. 7 is a sequence chart illustrating a first method for resource allocation based on inter-UE coordination information.

FIG. 7 is a sequence chart illustrating a first method for resource allocation based on inter-UE coordination information.

As shown in FIG. 7, a communication system may include a UE-A and a UE-B. The UE-B may transmit a signaling #1 including at least one of resource information, resource sensing/selection information, or a resource request indicator to the UE-A (S710). The signaling #1 may be at least one of SI signaling, RRC signaling, MAC signaling, or PHY signaling. The UE-A may receive the signaling #1 from the UE-B and may identify information element(s) included in the signaling #1. The resource information included in the signaling #1 may include at least one of resource pool (RP) information, time resource information, or frequency resource information. The RP information may indicate an RP (e.g., TX RP) allocated to the UE-B. The time resource information may indicate time resource(s) within the RP (e.g., TX RP) allocated to the UE-B, and the frequency resource information may indicate frequency resource(s) within the RP (e.g., TX RP) allocated to the UE-B. The time resource information may indicate some or all of time resources sensed by the UE-B, and the frequency resource information may indicate some or all of frequency resources sensed by the UE-B.

The resource information included in the signaling #1 may indicate a resource region arbitrarily selected by the UE-B. The resource information included in the signaling #1 may indicate a resource region for which the UE-B desires resource sensing. The resource information included in the signaling #1 may indicate a resource region that the UE-B prefers for data transmission. The resource information included in the signaling #1 may indicate a resource region that UE-B does not prefer for data transmission.

The resource information of the signaling #1 may include the time resource information and the frequency resource information without the RP information. Alternatively, the signaling #1 may not include the time resource information and the frequency resource information. The resource sensing/selection information of the signaling #1 may include configuration information (e.g., parameters, configuration values) associated with a resource sensing operation and/or configuration information (e.g., parameters, configuration values) associated with a resource selection operation. The configuration information on the resource sensing operation and/or the resource selection operation may be configured to the UE-B by system information, higher layer signaling, and/or physical layer signaling. The resource request indicator included in the signaling #1 may be used to request the UE-A to transmit resource information (e.g., inter-UE coordination information).

The signaling #1 may be transmitted through a sidelink (e.g., PSCCH and/or PSSCH). For example, the signaling #1 (e.g., resource information, resource sensing/selection information, and/or resource request indicator) may be included in SCI (e.g., first-stage SCI and/or second-stage SCI), MAC CE, and/or higher layer message (e.g., RRC message). The transmission of the signaling #1 through a PSSCH may mean that the signaling #1 is included in second-stage SCI.

The UE-A may generate inter-UE coordination information based on information element(s) included in the signaling #1 received from the UE-B. The UE-A may transmit a signaling #2 including the inter-UE coordination information to the UE-B (S720). The signaling #2 may be at least one of SI signaling, RRC signaling, MAC signaling, or PHY signaling. The signaling #2 may be used with the same meaning as the inter-UE coordination information. The UE-B may receive the signaling #2 from the UE-A, and may identify the inter-UE coordination information included in the signaling #2. The UE-B may perform a resource allocation operation based on the inter-UE coordination information (S730). The resource allocation operation may include a resource sensing operation and/or a resource selection operation. The resource allocation operation may be an operation of determining resource(s) to be used for sidelink communication. The UE-B may select (e.g., allocate, determine) resource(s) based on the inter-UE coordination information, and may perform sidelink communication using the resource(s).

A transmission scheme of inter-UE coordination information may be classified into a triggering scheme and a non-triggering scheme. In case that the triggering scheme is used, when the signaling #1 triggering transmission of inter-UE coordination information is received, the UE-A may transmit the signaling #2 including inter-UE coordination information to the UE-B. In case that the non-triggering scheme is used, the UE-A may transmit the signaling #2 including inter-UE coordination information to the UE-B without receiving the signaling #1 triggering transmission of inter-UE coordination information.

Exemplary Embodiment #1: Case when Signaling #1 Includes Resource Information

In the exemplary embodiment #1, inter-UE coordination information may be transmitted based on the triggering scheme. When the signaling #1 includes resource information, the UE-A may determine non-preferred resource(s) within a resource region indicated by the signaling #1, generate inter-UE coordination information indicating the non-preferred resource(s), and transmit the signaling #2 including the inter-UE coordination information to the UE-B. The UE-A may determine (e.g., select) the non-preferred resource(s) by performing a resource sensing operation on the resource region indicated by the signaling #1. The UE-A may determine the non-preferred resource(s) within the resource region indicated by the signaling #1 based on a result of resource sensing operations from the past to the present.

When all resources belonging to the resource region indicated by the signaling #1 are non-preferred resources, the UE-A may generate inter-UE coordination information indicating preferred resource(s), and transmit the signaling #2 including the inter-UE coordination information. A type of resource(s) indicated by the inter-UE coordination information (e.g., preferred resource(s), non-preferred resource(s), or conflicting resource(s)) may be explicitly indicated by the inter-UE coordination information.

Alternatively, the type of resource(s) indicated by the inter-UE coordination information may not be explicitly indicated. That is, the type of resource(s) indicated by the inter-UE coordination information may be implicitly indicated by the inter-UE coordination information. In this case, when the resource(s) indicated by the signaling #2 (e.g., inter-UE coordination information) belong to the resource region indicated by the signaling #1, the UE-B may determine that the resource(s) indicated by the signaling #2 are non-preferred resource(s). When the resource(s) indicated by the signaling #2 (e.g., inter-UE coordination information) do not belong to the resource region indicated by the signaling #1, the UE-B may determine that the resource(s) indicated by the signaling #2 are preferred resource(s).

The type of resource(s) indicated by the signaling #2 (e.g., inter-UE coordination information) may be implicitly indicated by a combination of the above-described schemes. When some of the resources indicated by the signaling #2 belong to the resource region indicated by the signaling #1, and the remaining resources indicated by the signaling #2 do not belong to the resource region indicated by the signaling #1, the UE-B may determine that the some resources indicated by the signaling #2 are non-preferred resources, and determine the remaining resources indicated by the signaling #2 as preferred resources.

Exemplary Embodiment #2: Case when Signaling #1 does not Include Resource Information In the exemplary embodiment #2, inter-UE coordination information may be transmitted based on the triggering scheme. When the signaling #1 does not include resource information, the UE-A may perform a resource sensing operation after receiving the signaling #1, determine (e.g., select) preferred resource(s) based on a result of the resource sensing operation, and transmit the signaling #2 including inter-UE coordination information indicating the preferred resource(s) to the UE-B. When the signaling #1 is received, the UE-A may determine (e.g., select) the preferred resource(s) based on a result of resource sensing operations from the past to the present, and transmit the signaling #2 including inter-UE coordination information indicating the preferred resource(s) to the UE-B.

Exemplary Embodiment #2-1: Case when Signaling #1 is not Transmitted

In the exemplary embodiment #2-1, inter-UE coordination information may be transmitted based on the non-triggering scheme. When a specific condition is satisfied based on information configured by higher layer signaling, the UE-A may determine (e.g., select) preferred resource(s) and/or non-preferred resource(s) based on a result of resource sensing operations from the past to the present, and may transmit the signaling #2 including inter-UE coordination information indicating the preferred resource(s) and/or non-preferred resource(s) to the UE-B.

When the inter-UE coordination information is configured to indicate one of preferred resource(s) and non-preferred resource(s), a separate indicator for indicating the type of resource(s) indicated by the inter-UE coordination information may not be required. When the UE-A selectively transmits inter-UE coordination information indicating preferred resource(s) or inter-UE coordination information indicating non-preferred resource(s), information indicating the type of resource(s) indicated by the inter-UE coordination information may be included in the inter-UE coordination information.

Each of the exemplary embodiment #1, exemplary embodiment #2, and exemplary embodiment #2-1 may be operated independently. A combination of the exemplary embodiment #1, exemplary embodiment #2, and/or exemplary embodiment #2-1 may be used. Modified exemplary embodiments based on the exemplary embodiment #1, exemplary embodiment #2, and/or exemplary embodiment #2-1 may be used. Exemplary embodiments extended based on the exemplary embodiment #1, exemplary embodiment #2, and/or exemplary embodiment #2-1 may be used.

Exemplary Embodiment #2-2: Combination of Exemplary Embodiment #1 and Exemplary Embodiment #2

The exemplary embodiment #1 and the exemplary embodiment #2 may be operated together. When the signaling #1 includes resource information, operations according to the exemplary embodiment #1 may be performed. When the signaling #1 does not include resource information, operations according to the exemplary embodiment #2 may be performed. The UE-A may perform a resource selection operation for determining preferred resource(s) and/or non-preferred resource(s) according to whether the signaling #1 includes resource information, and may transmit inter-UE coordination information indicating the preferred resource(s) and/or non-preferred resource(s) determined according to a result of the resource selection operation to the UE-B. When the signaling #1 includes resource information, the UE-A may transmit to the UE-B the signaling #2 including inter-UE coordination information indicating non-preferred resource(s), inter-UE coordination information indicating preferred resource(s), or inter-UE coordination information indicating non-preferred resource(s) and preferred resource(s).

The UE-B may identify the type of resource(s) indicated by the inter-UE coordination information included in the signaling #2 based on whether the signaling #1 includes resource information. When the signaling #1 includes resource information, the UE-B may identify the type of resource(s) indicated by the signaling #2 as non-preferred resource(s). When the signaling #1 does not include resource information, the UE-B may identify the type of resource(s) indicated by the signaling #2 as preferred resource(s).

Exemplary Embodiment #2-3: Modified Exemplary Embodiment #1, Modified Exemplary Embodiment #2, and Combination of the Above-Described Exemplary Embodiments When the exemplary embodiment #1 is used, the signaling #1 may include resource information. In this case, the UE-A may select non-preferred resource(s) within a resource region indicated by the signaling #1, and may transmit the signaling #2 including inter-UE coordination information indicating the non-preferred resource(s) to the UE-B. In addition, the UE-A may additionally select preferred resource(s), and may transmit the signaling #2 including inter-UE coordination information indicating the preferred resource(s) to the UE-B.

When the exemplary embodiment #2 is used, the signaling #1 may not include resource information. In this case, the UE-A may select preferred resource(s) and may transmit the signaling #2 including inter-UE coordination information indicating the preferred resource(s) to the UE-B.

A modified exemplary embodiment #1 modified based on the exemplary embodiment #1 and a modified exemplary embodiment #2 modified based on the exemplary embodiment #2 may be used. In the modified exemplary embodiment #1, when the signaling #1 includes resource information, the UE-A may select preferred resource(s) within a resource region indicated by the signaling #1, and transmit the signaling #2 including inter-UE coordination information indicating the preferred resource(s) to the UE-B. In addition, the UE-A may additionally select non-preferred resource(s) and may transmit the signaling #2 including inter-UE coordination information indicating the non-preferred resource(s) to the UE-B.

In the modified exemplary embodiment #2, when the signaling #1 does not include resource information, the UE-A may select non-preferred resource(s), and transmit the signaling #2 including inter-UE coordination information indicating the non-preferred resource(s) to the UE-B.

The modified exemplary embodiment #1 and the modified exemplary embodiment #2 may be operated independently. A combination of the modified exemplary embodiment #1 and the modified exemplary embodiment #2 may be used. A modified exemplary embodiment #2-2 may be a combination of the modified exemplary embodiment #1 and the modified exemplary embodiment #2. In the modified exemplary embodiment #2-2, when the signaling #1 includes resource information, operations according to the modified exemplary embodiment #1 may be performed, and when the signaling #1 does not include resource information, operations according to the modified exemplary embodiment #2 may be performed.

The UE-A may perform a resource selection operation for determining preferred resource(s) and/or non-preferred resource(s) according to whether the signaling #1 includes resource information, and may transmit inter-UE coordination information indicating the preferred resource(s) and/or non-preferred resource(s) determined according to a result of the resource selection operation to the UE-B. When the signaling #1 includes resource information, the UE-A may transmit to the UE-B the signaling #2 including inter-UE coordination information indicating non-preferred resource(s), inter-UE coordination information indicating preferred resource(s), or inter-UE coordination information indicating non-preferred resource(s) and preferred resource(s).

The UE-B may identify the type of resource(s) indicated by the inter-UE coordination information included in the signaling #2 based on whether the signaling #1 includes resource information. When the signaling #1 includes resource information, the UE-B may identify the type of resource(s) indicated by the signaling #2 as preferred resource(s). When the signaling #1 does not include resource information, the UE-B may identify the type of resource(s) indicated by the signaling #2 as non-preferred resource(s).

Combinations and/or extensions of the exemplary embodiment #1, exemplary embodiment #2, exemplary embodiment #2-1, exemplary embodiment #2-2, modified exemplary embodiment #1, modified exemplary embodiment #2, and/or modified exemplary embodiment #2-2 may be used. For example, when a combination of the exemplary embodiment #2-2 and the modified exemplary embodiment #2-2 is used, whether operations according to the exemplary embodiment #2-2 or operations according to the modified exemplary embodiment #2-2 are performed may be indicated (e.g., configured) to the UE by system information, higher layer signaling, and/or physical layer signaling. That is, when a combination of exemplary embodiments is used, operations according to which exemplary embodiment are performed may be indicated (e.g., configured) to the UE by system information, higher layer signaling, and/or physical layer signaling.

Exemplary Embodiment #3: Case when a Plurality of UE-As Transmit Inter-UE Coordination Information FIG. 8 is a sequence chart illustrating a second method for resource allocation based on inter-UE coordination information.

Figure 8:
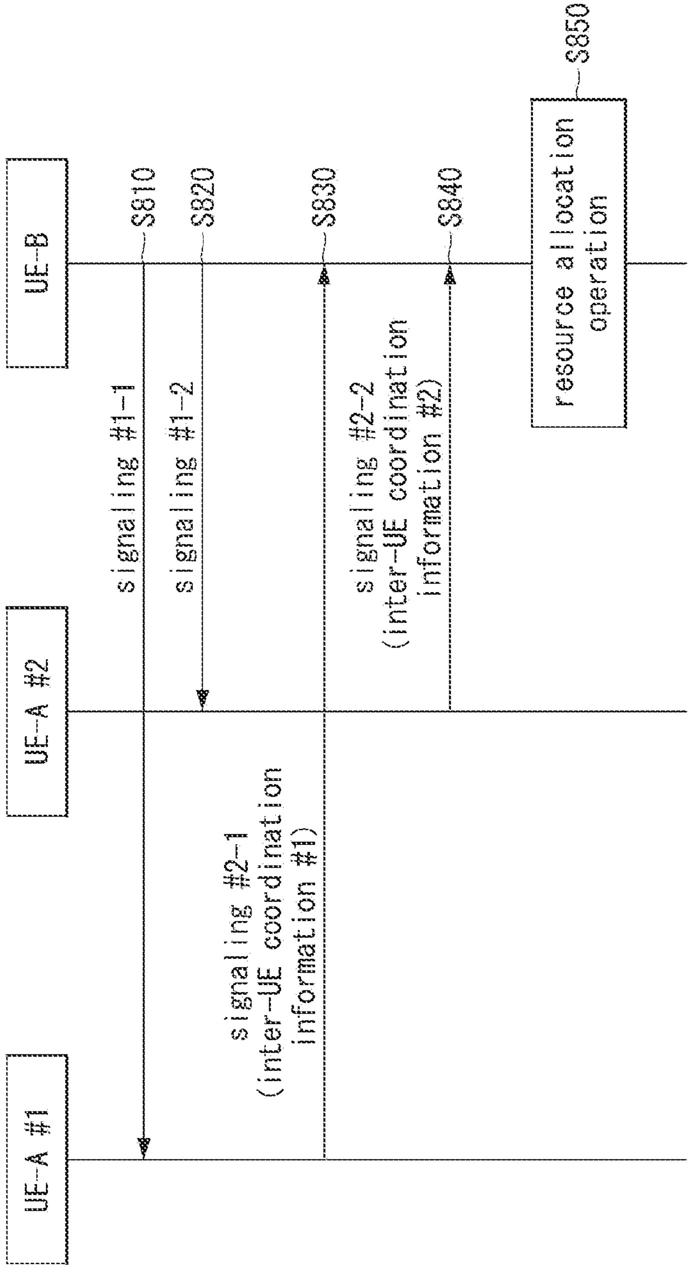
FIG. 8 is a sequence chart illustrating a second method for resource allocation based on inter-UE coordination information.

As shown in FIG. 8, a communication system may include a UE-A #1, UE-A #2, and UE-B. In a scenario of FIG. 8, the exemplary embodiments #1 and #2 may be applied as being extended. The UE-B may transmit a signaling #1-1 including at least one of resource information, resource sensing/selection information, and a resource request indicator to the UE-A #1 (S810), and may transmit a signaling #1-2 including at least one of resource information, resource sensing/selection information, and a resource request indicator to the UE-A #2 (S820). Each of the signaling #1-1 and the signaling #1-2 may be transmitted in a unicast scheme. The signaling #1-1 and signaling #1-2 may include the same information element(s). Alternatively, the signaling #1-1 and the signaling #1-2 may include different information element(s). Both of the signaling #1-1 and the signaling #1-2 may not include resource information. Alternatively, one of the signaling #1-1 and the signaling #1-2 may include resource information, and the other signaling may not include resource information.

The UE-A #1 may receive the signaling #1-1 from the UE-B and may identify information element(s) included in the signaling #1-1. The UE-A #1 may generate inter-UE coordination information #1 based on the information element(s) included in the signaling #1-1 received from the UE-B. The UE-A #1 may transmit a signaling #2-1 including the inter-UE coordination information #1 to the UE-B (S830). The UE-A #2 may receive the signaling #1-2 from the UE-B and may identify information element(s) included in the signaling #1-2. The UE-A #2 may generate inter-UE coordination information #2 based on the information element(s) included in the signaling #1-2 received from the UE-B. The UE-A #2 may transmit a signaling #2-2 including the inter-UE coordination information #2 to the UE-B (S840).

The UE-B may receive the signaling #2-1 from the UE-A #1, and may identify the inter-UE coordination information #1 included in the signaling #2-1. In addition, the UE-B may receive the signaling #2-2 from the UE-A #2, and may identify the inter-UE coordination information #2 included in the signaling #2-2.

The UE-B may perform a resource allocation operation based on the inter-UE coordination information #1 and/or the inter-UE coordination information #2 (S850). The resource allocation operation may include a resource sensing operation and/or a resource selection operation. The UE-B may select (e.g., allocate, determine) resource(s) based on the inter-UE coordination information #1 and/or the inter-UE coordination information #2, and may perform sidelink communication using the resource(s).

Based on the information indicated by the signaling #1-1, information indicated by the signaling #1-2, information on resource(s) sensed by the UE-A #1, and/or information on resource(s) sensed by the UE-A #2, operations according to the exemplary embodiment #1, exemplary embodiment #2, exemplary embodiment #2-2, modified exemplary embodiment #1, modified exemplary embodiment #2, and/or modified exemplary embodiment #2-2 may be independently applied to the UE-A #1 and the UE-A #2, respectively.

Figure 9:
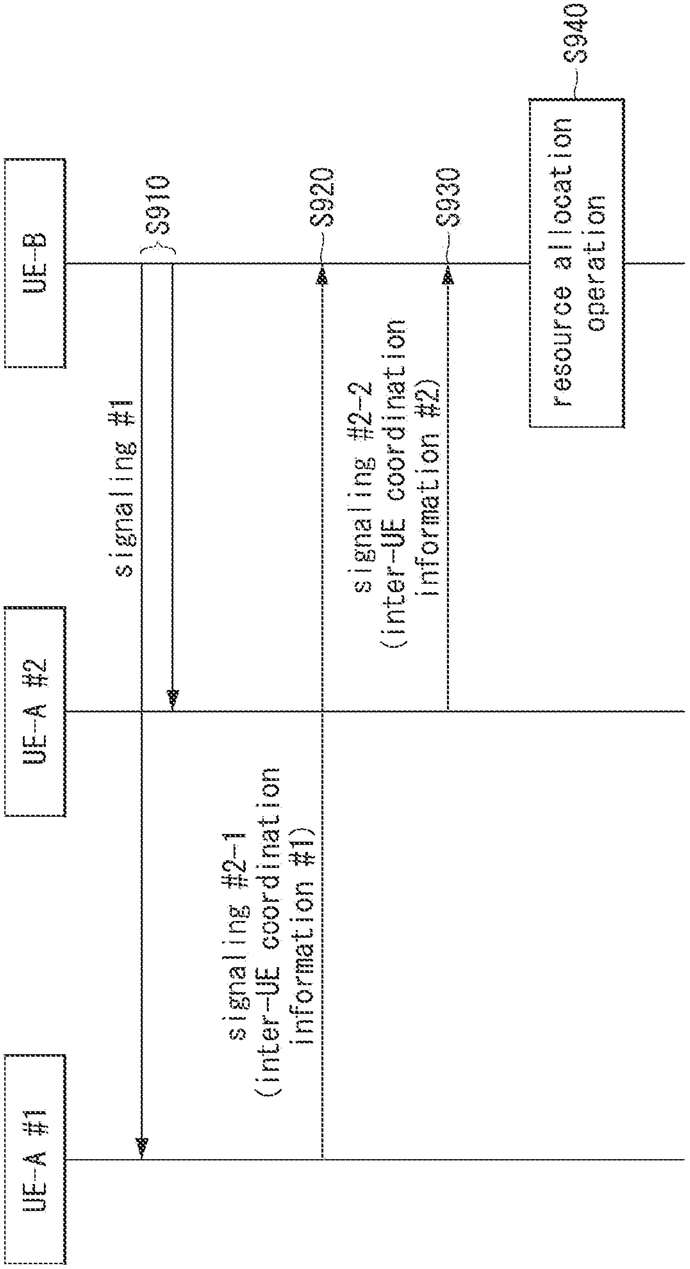
FIG. 9 is a sequence chart illustrating a third method for resource allocation based on inter-UE coordination information.

FIG. 9 is a sequence chart illustrating a third method for resource allocation based on inter-UE coordination information.

As shown in FIG. 9, a communication system may include a UE-A #1, UE-A #2, and UE-B. The UE-B may transmit a signaling #1 including at least one of resource information, resource sensing/selection information, or a resource request indicator to the UE-A #1 and UE-A #2 (S910). The signaling #1 may be transmitted in a groupcast scheme or broadcast scheme. The UE-A #1 may receive the signaling #1 from the UE-B and may identify information element(s) included in the signaling #1. The UE-A #1 may generate inter-UE coordination information #1 based on the information element(s) included in the signaling #1 received from the UE-B. The UE-A #1 may transmit a signaling #2-1 including the inter-UE coordination information #1 to the UE-B (S920). The UE-A #2 may receive the signaling #1 from the UE-B and may identify information element(s) included in the signaling #1. The UE-A #2 may generate inter-UE coordination information #2 based on the information element(s) included in the signaling #1 received from the UE-B. The UE-A #2 may transmit a signaling #2-2 including the inter-UE coordination information #2 to the UE-B (S930).

The UE-B may receive the signaling #2-1 from the UE-A #1 and may identify the inter-UE coordination information #1 included in the signaling #2-1. In addition, the UE-B may receive the signaling #2-2 from the UE-A #2 and may identify the inter-UE coordination information #2 included in the signaling #2-2. The UE-B may perform a resource allocation operation based on the inter-UE coordination information #1 and/or the inter-UE coordination information #2 (S940). The resource allocation operation may include a resource sensing operation and/or a resource selection operation. The UE-B may select (e.g., allocate, determine) resource(s) based on the inter-UE coordination information #1 and/or the inter-UE coordination information #2, and may perform sidelink communication using the resource(s).

Based on the information indicated by the signaling #1, information on resource(s) sensed by the UE-A #1, and/or information on resource(s) sensed by the UE-A #2, operations according to the exemplary embodiment #1, exemplary embodiment #2, exemplary embodiment #2-2, modified exemplary embodiment #1, modified exemplary embodiment #2, and/or modified exemplary embodiment #2-2 may be independently applied to the UE-A #1 and the UE-A #2, respectively.

Figure 10:
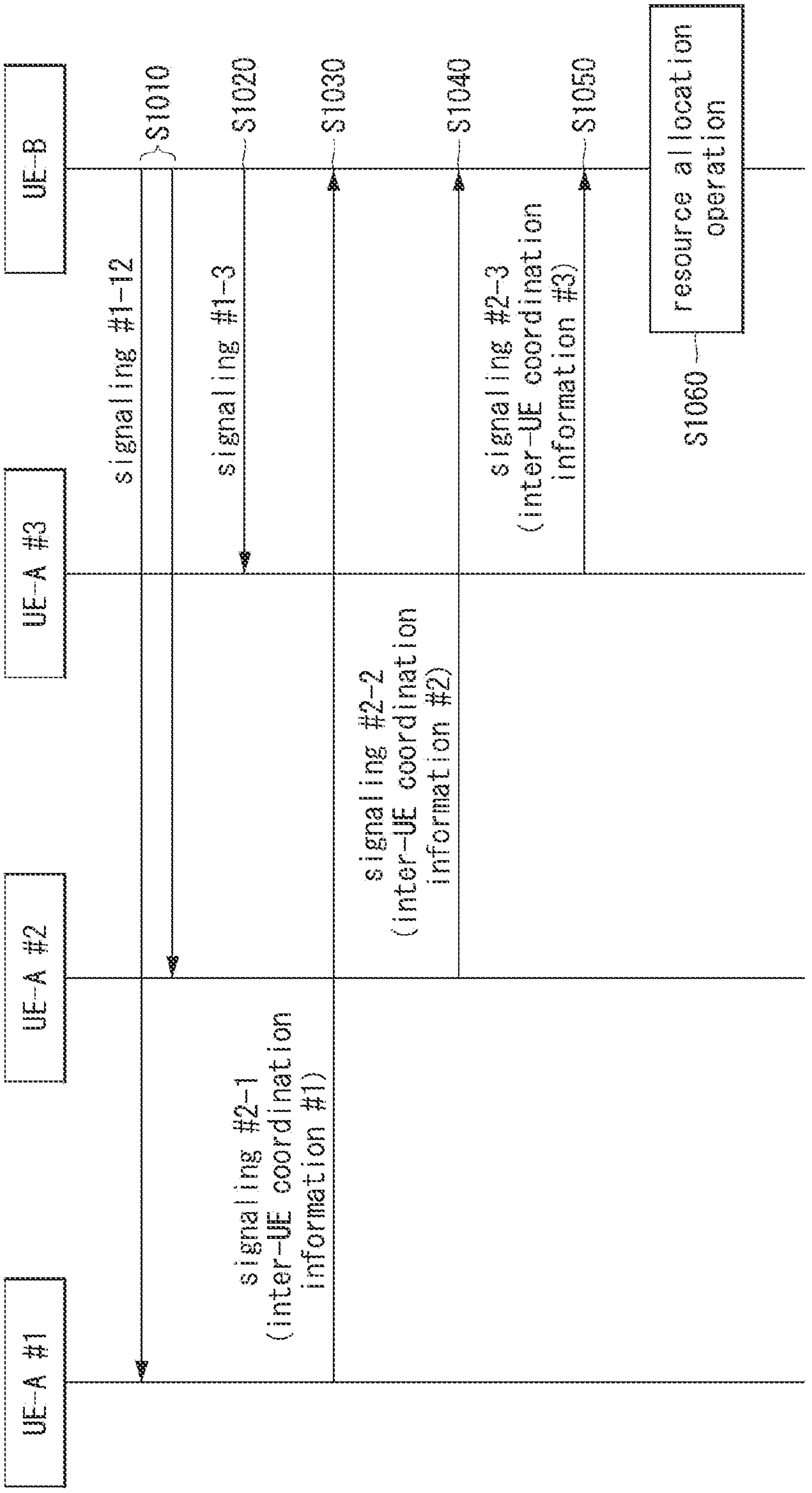
FIG. 10 is a sequence chart illustrating a fourth method for resource allocation based on inter-UE coordination information.

FIG. 10 is a sequence chart illustrating a fourth method for resource allocation based on inter-UE coordination information.

As shown in FIG. 10, a communication system may include a UE-A #1, UE-A #2, UE-A #3, and UE-B. The UE-B may transmit a signaling #1-12 including at least one of resource information, resource sensing/selection information, or a resource request indicator to the UE-A #1 and the UE-A #2 (S1010), and may transmit a signaling #1-3 including at least one of resource information, resource sensing/selection information, or a resource request indicator to the UE-A #3 (S1020). The signaling #1-12 may be transmitted in a groupcast scheme or broadcast scheme, and the signaling #1-3 may be transmitted in a unicast scheme. The signaling #1-12 and the signaling #1-3 may include the same information element(s). Alternatively, the signaling #1-12 and the signaling #1-3 may include different information element(s). Both of the signaling #1-12 and the signaling #1-3 may not include resource information. Alternatively, one of the signaling #1-12 and the signaling #1-3 may include resource information, and the other signaling may not include resource information.

The UE-A #1 may receive the signaling #1-12 from the UE-B and may identify information element(s) included in the signaling #1-12. The UE-A #1 may generate inter-UE coordination information #1 based on the information element(s) included in the signaling #1-12 received from the UE-B. The UE-A #1 may transmit a signaling #2-1 including the inter-UE coordination information #1 to the UE-B (S1030). The UE-A #2 may receive the signaling #1-12 from the UE-B and may identify the information element(s) included in the signaling #1-12. The UE-A #2 may generate inter-UE coordination information #2 based on the information element(s) included in the signaling #1-12 received from the UE-B. The UE-A #2 may transmit a signaling #2-2 including the inter-UE coordination information #2 to the UE-B (S1040). The UE-A #3 may receive the signaling #1-3 from the UE-B and may identify information element(s) included in the signaling #1-3. The UE-A #3 may generate inter-UE coordination information #3 based on the information element(s) included in the signaling #1-3 received from the UE-B. The UE-A #3 may transmit a signaling #2-3 including the inter-UE coordination information #3 to the UE-B (S1050).

The UE-B may receive the signaling #2-1 from the UE-A #1 and may identify the inter-UE coordination information #1 included in the signaling #2-1. In addition, the UE-B may receive the signaling #2-2 from the UE-A #2 and may identify the inter-UE coordination information #2 included in the signaling #2-2. In addition, the UE-B may receive the signaling #2-3 from the UE-A #3 and may identify the inter-UE coordination information #3 included in the signaling #2-3.

The UE-B may perform a resource allocation operation based on the inter-UE coordination information #1, inter-UE coordination information #2, and/or inter-UE coordination information #3 (S1060). The resource allocation operation may include a resource sensing operation and/or a resource selection operation. The UE-B may select (e.g., assign, determine) resource(s) based on the inter-UE coordination information #1, inter-UE coordination information #2, and/or inter-UE coordination information #3, and perform sidelink communication using the resource(s).

Based on the information indicated by the signaling #1-12, information indicated by the signaling #1-3, information on resource(s) sensed by the UE-A #1, information on resource(s) sensed by the UE-A #2, and/or information on resource(s) sensed by the UE-A #3, operations according to the exemplary embodiment #1, exemplary embodiment #2, exemplary embodiment #2-2, modified exemplary embodiment #1, modified exemplary embodiment #2, and/or modified exemplary embodiment #2-2 are independently applied to the UE-A #1, UE-A #2, and UE-A #3, respectively.

The method according to FIG. 10 may be applied to a scenario in which a plurality of groupcast transmissions and a plurality of unicast transmissions for the signaling #1 are performed. Alternatively, the UE-B may transmit the signaling #1 in a broadcast scheme. A UE may receive the signaling #1 from the UE-B. When a specific condition is satisfied, the UE may perform a role of a UE-A transmitting inter-UE coordination information. The specific condition may include a condition that a received signal strength of the signaling #1 satisfies a first criterion and/or a condition that a distance between the UE-B and the UE receiving the signaling #1 satisfies a second criterion.

Based on the information indicated by the signaling #1 (e.g., whether the signaling #1 includes resource information) and/or information on resource(s) sensed by the UE-A(s), operations according to the exemplary embodiment #1, exemplary embodiment #2, exemplary embodiment #2-2, modified exemplary embodiment #1, modified exemplary embodiment #2, and/or modified exemplary embodiment #2-2 may be independently applied to the UE-A #1(s).

The methods of FIGS. 8 to 10 may be applied to a scenario in which UE-A(s) transmit inter-UE coordination information based on the triggering scheme and/or a scenario in which one or more UE-As among the UE-As transmit inter-UE coordination information based on the non-triggering scheme.

Exemplary Embodiment #4: Case when a Resource Size Required for UE-B (e.g., Resource Size Requested by UE-B) is Indicated by Signaling #1

Based on the information indicated by the signaling #1 (e.g., whether the signaling #1 includes resource information) and/or information on resource(s) sensed by UE-A(s), the UE-A(s) may transmit a signaling #2 including inter-UE coordination information indicating preferred resource(s) or non-preferred resource(s) to the UE-B. When the signaling #1 includes information (hereinafter referred to as 'required resource information') indicating a size of resource(s) required by the UE-B (e.g., a size of resource(s) requested by the UE-B), operations according to the exemplary embodiments #1, #2, and/or #3 may be performed as follows.

The resource size indicated by the required resource information may be assumed to be X, and X may be indicated by the signaling #1. The UE-A may transmit a signaling #2 including inter-UE coordination information indicating resource(s) having a size corresponding to X indicated by the signaling #1 to the UE-B. The size of resource(s) indicated by the inter-UE coordination information may be greater than or equal to X indicated by the signaling #1. The required resource information may indicate a size of time resource(s) and/or frequency resource(s). A unit of resources indicated by the required resource information may be a resource block (RB), sub-channel, subcarrier, slot, mini-slot, subframe, and/or symbol. X may be the minimum size of resources required by the UE-B. The required resource information may include information on the minimum size of resources required by the UE-B and information on the maximum size of resources required the by UE-B.

In the exemplary embodiment #1, when the size of resources excluding non-preferred resources within a resource region indicated by the signaling #1 is smaller than X, the UE-A may additionally select preferred resource(s) outside the resource region indicated by the signaling #1 so that the size of resources available to the UE-B (e.g., resources selectable by the UE-B, i.e., preferred resources) is greater than X, and may transmit a signaling #2 including inter-UE coordination information indicating the preferred resource(s) to the UE-B. The above-described exemplary embodiment #1 may be referred to as 'extended exemplary embodiment #1'.

In the exemplary embodiment #2, the UE-A may select preferred resource(s) so that the size of resources available to the UE-B (e.g., resources selectable by the UE-B, i.e., preferred resources) is greater than or equal to X, and may transmit a signaling #2 including inter-UE coordination information indicating the preferred resource(s) to the UE-B. The above-described exemplary embodiment #2 may be referred to as 'extended exemplary embodiment #2'.

Each of the extended exemplary embodiment #1 and extended exemplary embodiment #2 may be independently applied to the UE-A(s). The signaling #1 transmitted to the UE-As in FIGS. 8 and 10 may include required resource information indicating different sizes. The above-described operation may be applied to the exemplary embodiment #2-3, modified exemplary embodiment #1, modified exemplary embodiment #2, and/or modified exemplary embodiment #2-2.

Exemplary Embodiment #5: Resource Selection Scheme of UE-B

In the exemplary embodiments #1 to #4, the UE-B may receive information on a plurality of preferred resources and/or information on a plurality of non-preferred resources. In this case, information on common preferred resource(s) may be provided to a plurality of UEs including the UE-B. When the UE-B preferentially selects the common preferred resource(s), a conflict may occur, and data transmission/reception efficiency may decrease.

The UE-B may select resource(s) by preferentially considering information on the plurality of non-preferred resources among information on the plurality of preferred resources and information on the plurality of non-preferred resources. In this case, the UE-B may select resource(s)

within a resource range excluding the non-preferred resource(s) within a resource region indicated by the signaling #1.

When a plurality of UE-Bs request transmission of inter-UE coordination information through the signaling(s) #1, the plurality of UE-Bs may transmit the signaling(s) #1 indicating different resource regions. According to this operation, a probability of a resource selection conflict within each resource region may be reduced. A location of resource(s) (e.g., resource region) indicated by the signaling #1 may be randomly selected by each UE (e.g., each UE-B). Alternatively, the resource region may be determined through an arbitrary calculation based on UE-specific parameters or values (e.g., UE ID, SL-related ID, source ID, destination ID).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method for operating a first user equipment wireless communication system, the method comprising:
- receiving, from a second UE, a first Medium Access Control Control Element (MAC CE) for triggering transmission of inter-user equipment (UE) coordination information, wherein the first MAC CE comprises first information indicating a resource region in a time domain;
- determining at least one resource within the resource region indicated by the first information as a non-preferred resource;
- transmitting, to the second UE, a second MAC CE including the inter-UE coordination information, wherein the inter-UE coordination information includes (i) second information indicating a location of the at least one resource and (ii) third information indicating the at least one resource being the non-preferred resource; and
- receiving, from the second UE, a Physical Sidelink Shared Channel (PSSCH) through resources except for the at least one resource determined as the non-preferred resource.

2. The method of claim 1, wherein, in a case that the first MAC CE does not include first information, determining the at least one resource comprises:
- determining the at least one resource as a preferred resource.

3. The method of claim 1, wherein the first MAC CE includes information on a resource size required by the second UE, and wherein a size of the at least one resource indicated by the inter-UE coordination information corresponds to the resource size indicated by the first MAC CE.

4. The method of claim 3, further comprising: in a case that a size of resources excluding non-preferred resources within the resource region is smaller than the resource size, additionally selecting a preferred resource outside the resource region.

5. A method of a second user equipment (UE) in a wireless communication system, the method comprising:
- transmitting, to a first UE, a first Medium Access Control Control Element (MAC CE) for triggering transmission of inter-user equipment (UE) coordination information, wherein the first MAC CE comprises first information indicating a resource region in a time domain;
- receiving, from the first UE, a second MAC CE including the inter-UE coordination information;
- wherein the inter-UE coordination information includes (i) second information indicating a location of at least one resource and (ii) third information indicating that the at least one resource is a non-preferred resource;
- wherein the at least one resource is determined within the resource region indicated by the first information as the non-preferred resource;
- determining resources for a Physical Sidelink Shared Channel (PSSCH) by excluding the at least one resource indicated as the non-preferred resource; and
- transmitting, to the first UE, the PSSCH through the determined resources.

6. The method of claim 5, wherein the first MAC CE includes information on a resource size required by the second UE, and a size of the at least one resource indicated by the inter-UE coordination information corresponds to the resource size indicated by the first MAC CE.

7. A first user equipment (UE) in a wireless communication system, the first UE comprising:
- a transceiver;
- a processor; and
- a memory storing one or more instructions executable by the processor,
- wherein the one or more instructions are executed to perform:
- receiving, from a second UE through the transceiver, a first Medium Access Control Control Element (MAC CE) for triggering transmission of inter-user equipment (UE) coordination information, wherein the first MAC CE comprises first information indicating a resource region in a time domain;
- determining at least one resource, within the resource region indicated by the first information, as a non-preferred resource;
- transmitting, to the second UE through the transceiver, a second MAC CE including the inter-UE coordination information, wherein the inter-UE coordination information includes (i) second information indicating a location of the at least one resource and (ii) third information indicating the at least one resource being the non-preferred resource; and
- receiving, from the second UE through the transceiver, a Physical Sidelink Shared Channel (PSSCH) through resources except for the at least one resource determined as the non-preferred resource.

8. The first UE of claim 7, wherein the first MAC CE includes information on a resource size required by the second UE, and wherein a size of the at least one resource indicated by the inter-UE coordination information corresponds to the resource size indicated by the first MAC CE.

9. The first UE of claim 8, wherein the one or more instructions are further executed to perform: in a case that a size of resources excluding non-preferred resources within the resource region is smaller than the resource size, additionally selecting a preferred resource outside the resource region.

* * * * *